(12) United States Patent
Ikeda et al.

(10) Patent No.: US 9,331,319 B2
(45) Date of Patent: May 3, 2016

(54) BATTERY CONNECTOR WITH A PLURALITY OF VOLTAGE DETECTION TERMINALS

(75) Inventors: Tomohiro Ikeda, Makinohara (JP); Keizo Aoki, Makinohara (JP); Yukihisa Kikuchi, Makinohara (JP); Ryuta Takishita, Makinohara (JP); Kaiho Ryu, Makinohara (JP); Masaru Imai, Makinohara (JP)

(73) Assignee: Yazaki Corporation, Tokyo (JP)

( * ) Notice: Subject to any disclaimer, the term of this patent is extended or adjusted under 35 U.S.C. 154(b) by 920 days.

(21) Appl. No.: 13/586,535

(22) Filed: Aug. 15, 2012

(65) Prior Publication Data

US 2012/0306474 A1    Dec. 6, 2012

Related U.S. Application Data

(63) Continuation of application No. PCT/JP2011/071779, filed on Sep. 16, 2011.

(30) Foreign Application Priority Data

Sep. 16, 2010    (JP) ................................. 2010-208065

(51) Int. Cl.
*H01R 13/72* (2006.01)
*H01M 2/10* (2006.01)
(Continued)

(52) U.S. Cl.
CPC ............ *H01M 2/1077* (2013.01); *H01M 2/206* (2013.01); *H01M 2/305* (2013.01); *H01M 10/482* (2013.01); *H01R 13/72* (2013.01)

(58) Field of Classification Search
CPC ....... H01R 13/72; H01R 111/00; H01R 23/00

USPC .................................................. 439/500–504
See application file for complete search history.

(56) References Cited

U.S. PATENT DOCUMENTS 6,240,637 B1    6/2001  Ikeda et al.
6,261,719 B1 *  7/2001  Ikeda .................... H01M 2/202
                                                    429/120
(Continued)

FOREIGN PATENT DOCUMENTS

CN    101789517 A    7/2010
EP    0 986 114 A1   3/2000
(Continued)

OTHER PUBLICATIONS

Information Offer Form dated Oct. 29, 2013, issued by the Japan Patent Office in corresponding Japanese Application No. 2013-119882.
(Continued)

*Primary Examiner* — Chandrika Prasad
(74) *Attorney, Agent, or Firm* — Sughrue Mion, PLLC

(57) ABSTRACT

A battery connector includes: a plurality of terminals, each of which is to be connected to each electrode of a plurality of batteries; a plurality of voltage detection terminals, each of which is connected to respective one of the terminals, and includes a wire connection part to be connected to an electric wire; and a case which contains the plurality of terminals and the plurality of voltage detection terminals therein. Adjacent terminals of the terminals are fixed in the case to be spaced from each other, and an individual wire path of a wire routing part is provided between the adjacent terminals. Each of the voltage detection terminals is fixed so as to incline the wire connection part with respect to the individual wire path and to locate the wire connection part more interiorly than an edge of the case.

8 Claims, 6 Drawing Sheets

(51) Int. Cl.
    *H01M 2/20*     (2006.01)
    *H01M 2/30*     (2006.01)
    *H01M 10/48*     (2006.01)

(56) References Cited

U.S. PATENT DOCUMENTS

| | | |
|---|---|---|
| 6,896,995 B2 | 5/2005 | Saito |
| 7,121,884 B2 | 10/2006 | Osada |
| 7,604,507 B1 | 10/2009 | Millon |
| 2001/0049055 A1 | 12/2001 | Saito |
| 2006/0014428 A1 | 1/2006 | Osada |
| 2009/0096418 A1* | 4/2009 | Abadia ............... H01G 9/14 320/116 |
| 2010/0055993 A1* | 3/2010 | Ikeda ............... H01M 2/1077 439/754 |
| 2010/0062329 A1* | 3/2010 | Muis ............... H01M 2/206 429/158 |
| 2010/0073005 A1 | 3/2010 | Yano et al. |
| 2010/0190050 A1 | 7/2010 | Ochi |
| 2011/0206978 A1 | 8/2011 | Muis |
| 2012/0009447 A1* | 1/2012 | Ikeda ............... H01M 2/206 429/90 |
| 2012/0231640 A1 | 9/2012 | Ikeda et al. |
| 2014/0087591 A1* | 3/2014 | Ikeda ............... H01M 2/206 439/627 |

FOREIGN PATENT DOCUMENTS

| | | | |
|---|---|---|---|
| EP | 2 048 725 A1 | 4/2009 | |
| JP | 2000-149909 A | 5/2000 | |
| JP | 2000-182583 A | 6/2000 | |
| JP | 2001-332235 A | 11/2001 | |
| JP | 2004031049 A | 1/2004 | |
| JP | 3707595 B2 | 8/2005 | |
| JP | 200612573 A | 1/2006 | |
| JP | 200976412 A | 4/2009 | |
| JP | 2009205865 A | 9/2009 | |
| JP | 2010-055885 A | 3/2010 | |
| JP | 2010114025 A | 5/2010 | |
| JP | 2010-225449 A | 10/2010 | |
| JP | 2011-018478 A | 1/2011 | |
| JP | 2011-091003 A | 5/2011 | |
| WO | 2009/022521 A1 | 2/2009 | |
| WO | 2011/043261 A1 | 4/2011 | |

OTHER PUBLICATIONS

Information Offer Form dated Oct. 29, 2013, issued by the Japan Patent Office in corresponding Japanese Application No. 2010-208065.
Office Action dated Jul. 1, 2014, issued by the Japanese Patent Office in counterpart Japanese Patent Application No. 2010-208065.
Office Action dated Jul. 1, 2014, issued by the Japanese Patent Office in counterpart Japanese Application No. 2013-119882.
Written Opinion (PCT/ISA/237) of the International Searching Authority, issued in corresponding International Application No. PCT/JP2011/071779 on Feb. 10, 2012.
International Search Report (PCT/ISA/210), issued by the International Searching Authority in corresponding International Application No. PCT/JP2011/071779 on Feb. 10, 2012.
Communication dated May 29, 2014 from the State Intellectual Property Office of P.R. China in a counterpart application No. 201180016963.5.
Communication dated Mar. 19, 2015 issued by the State Intellectual Property Office of the People's Republic of China in counterpart Chinese Patent Application No. 201310476034.3.
Notice, Issued by the Japan Patent Office, Dated Nov. 19, 2014, In counterpart Japanese Application No. 2013-119882.
Office Action dated Feb. 14, 2014 issued by the European Patent Office in counterpart European Patent Application No. 11767307.9.
Notification of the Third Office Action issued on Jan. 26, 2016 by the International Searching Authority in related Application No. 201310476034.3.

* cited by examiner

BATTERY CONNECTOR WITH A PLURALITY OF VOLTAGE DETECTION TERMINALS

CROSS REFERENCE TO RELATED APPLICATION

This application is a continuation of PCT application No. PCT/JP2011/071779, which was filed on Sep. 16, 2011 based on Japanese Patent Application (No. 2010-208065) filed on Sep. 16, 2010, the contents of which are incorporated herein by reference. Also, all the references cited herein are incorporated as a whole.

BACKGROUND OF THE INVENTION

1. Technical Field

The present invention relates to a battery connector for making a connection between electrodes of a plurality of batteries.

2. Background Art

In recent electric vehicles and hybrid vehicles, a battery assembly is mounted as a compact power supply having a high power and a high output. A battery connector is used, for example, to serially connect a plurality of batteries of the battery assembly.

An example of the battery connector is disclosed in JP-B-3707595 (JP-A-2000-149909). In a battery assembly applied to the battery connector, a plurality of batteries which include plus electrodes (in a bolt-like shape) and minus electrodes (in a bolt-like shape) on opposing surfaces are layered so that, for example, the plus electrodes and the minus electrodes are alternately aligned on the same surface. A pair of battery connectors is used to serially connect the plurality of batteries which are layered. One of the pair of battery connectors is shown in FIG. 5 and FIG. 6.

In FIG. 5 and FIG. 6, a battery connector 50 includes a plurality of terminals 51, 52 to be connected to each electrode (not shown in figures) of the batteries, a plurality of voltage detection terminals 53 which are partly superimposed on the respective terminals 51, 52, and a case 60 which covers the plurality of terminals 51, 52 and the voltage detection terminals 53. The battery connector 50 is formed by insert-forming the case 60 while considering the plurality of terminals 51, 52 and the voltage detection terminals 53 as insert-parts.

The plurality of terminals 51, 52 includes two types of terminals. One is end terminals 51 for connecting to both ends electrodes of the battery serial connection, and the other one is electrode-connection terminals 52 for connecting to intermediate electrodes except for the both ends. Each of the end terminals 51 has one hole, and is connected and fastened by a nut to the farthest end electrode of the serially-connected batteries. The voltage detection terminal 53 and a power terminal 70 are connected and fastened together to the end terminal 51. Each of the electrode-connection terminals 52 has two holes, and is connected and fastened by a nut to each electrode of adjacent batteries. In one nut fastening, the voltage-connection terminal 53 is fastened together.

The case 60 includes a terminal fixing part 61 which fixes the plurality of terminals 51, 52 and the voltage detection terminals 53, three-divided insulating covers 62 which are linked to the terminal fixing part 61 via hinges 62a, and a plurality of first wire guides 63 and second wire guides 64 which are extended from an edge of the terminal fixing part 61 along a width direction of the case 60.

The plurality of terminals 51, 52 are fixed on the terminal fixing part 61 in a line to be spaced from one another. The plurality of voltage detection terminals 53 are also fixed on the terminal fixing part 61 to be partly superimposed on the terminals 51, 52.

Each of the insulating covers 62 is rotatably displaced about the hinge 62a as a fulcrum to a closing position for covering an open face of the terminal fixing part 61.

Each of the first wire guides 63 is formed in a groove-shape. The first wire guide 63 guides an electric wire W connected to the power terminal 70 along a predetermined path.

Each of the second wire guides 64 includes a tub part 64a, a hinge part 64b, and a lid part 64c which is capable of covering an open face of the tub part 64a. The second wire guide 64 guides an electric wire W connected to the voltage detection terminal 53 along a predetermined path.

In the other of the battery connectors, all of the plurality of terminals are constituted by electrode-connection terminals.

According to the above example, since the battery connector 50 includes the plurality of voltage detection terminals 53, a user can check output states of all batteries easily, and find defective batteries in a short time. Further, since the plurality of terminals 51, 52, etc. exposed from the terminal fixing part 51 can be covered by the insulating cover 62, accidents such as short-circuit can be avoided as much as possible.

SUMMARY OF THE INVENTION

In the battery connector 50, however, since a wire connection part 53a of the voltage detection terminal 53 is protruded more exteriorly than the edge of the case 60 in its width direction, the second wire guide 64 is further protruded more exteriorly than the protrusion position of the wire connection part 53a. Thus, a width dimension D (shown in FIG. 5) of the battery connector 50 at the location of the wire guide is enlarged, and it causes the battery connector 50 to be larger.

The present invention is achieved to solve the problems, and an object of the present invention is to provide a battery connector having a function of guiding a drawn electric wire, which achieves compactification of the battery connector itself, and which can guide an electric wire without folding the electric wire tightly as much as possible.

An aspect of the present invention provides a battery connector, including: a plurality of terminals, each of which is to be connected to each electrode of a plurality of batteries; a plurality of voltage detection terminals, each of which is connected to respective one of the terminals, and includes a wire connection part to be connected to an electric wire; and a case which contains the plurality of terminals and the plurality of voltage detection terminals therein, wherein adjacent terminals of the terminals are fixed in the case to be spaced from each other, and an individual wire path of a wire routing part is provided between the adjacent terminals, and each of the voltage detection terminals is fixed so as to incline the wire connection part with respect to the individual wire path and to locate the wire connection part more interiorly than an edge of the case.

The battery connector may be configured so that an inclined angle of the wire connection part is 45 degrees to an orthogonal direction to the edge of the case.

The battery connector may be configured so that it includes a plurality of covers, of which adjacent covers are closely disposed, wherein a face of the case in which the terminals and the voltage detection terminals are disposed is covered by the plurality of covers, and each of the covers is provided with a rib which protrudes toward the case from a side end of an inner surface of each of the covers.

The battery connector may be configured so that it includes a connector fixing part to which a connector is to be fixed, wherein the wire routing part includes a bundle wires path, an end of which is connected to the connector fixing part, and the bundle wires path is connected to the respective individual wire paths to guide electric wires extended from respective wire connection parts to the connector fixing part. Each of the plurality of terminal fixing parts may have a rectangular shape with a long side in the direction in which the adjacent terminals are aligned and a short side in the direction orthogonal to the direction in which the adjacent terminals are aligned, and the wire connection part of the voltage detection terminal may be disposed at a corner part at which the long side of the terminal fixing part is connected to the short side.

According to the aspect of the invention, the wire connection part of the voltage detection terminal is not protruded more exteriorly than the edge of the case, and the wire routing part is disposed by utilizing a space between the terminal fixing parts of the case. Thus, the battery connector can be made smaller. Further the electric wire connected to the wire connection part of the voltage detection terminal can be guided to the wire routing part by folding loosely. Thus, the electric wire can be guided without folding it tightly as much as possible. In this way, the battery connector having a function of guiding a drawn electric wire can be made small, and can guide the electric wire without folding the electric wire tightly as much as possible.

DETAILED DESCRIPTION OF THE EXEMPLARY EMBODIMENTS

Here, an embodiment of the present invention will be explained with reference to accompanying drawings.

Figure 1:
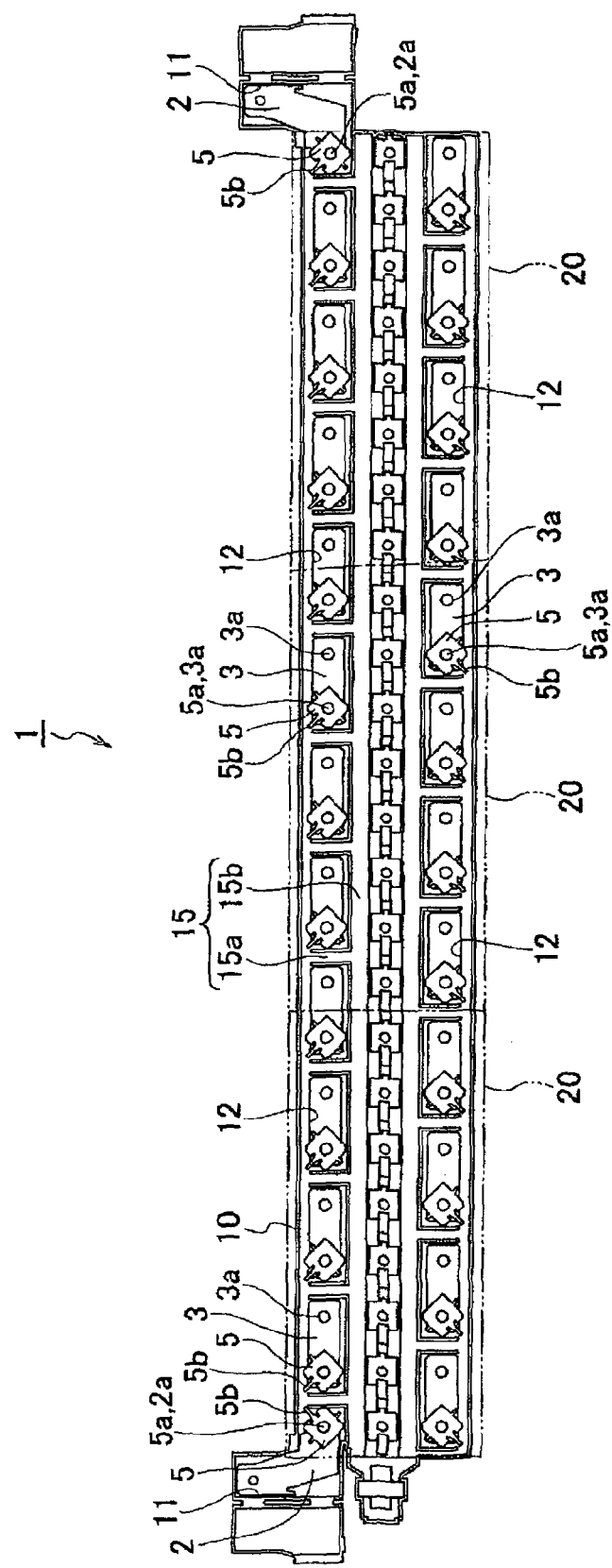
FIG. 1 is a plan view of a battery connector in which a case is not covered by a cover, for showing a first embodiment of the invention.
Figure 2:
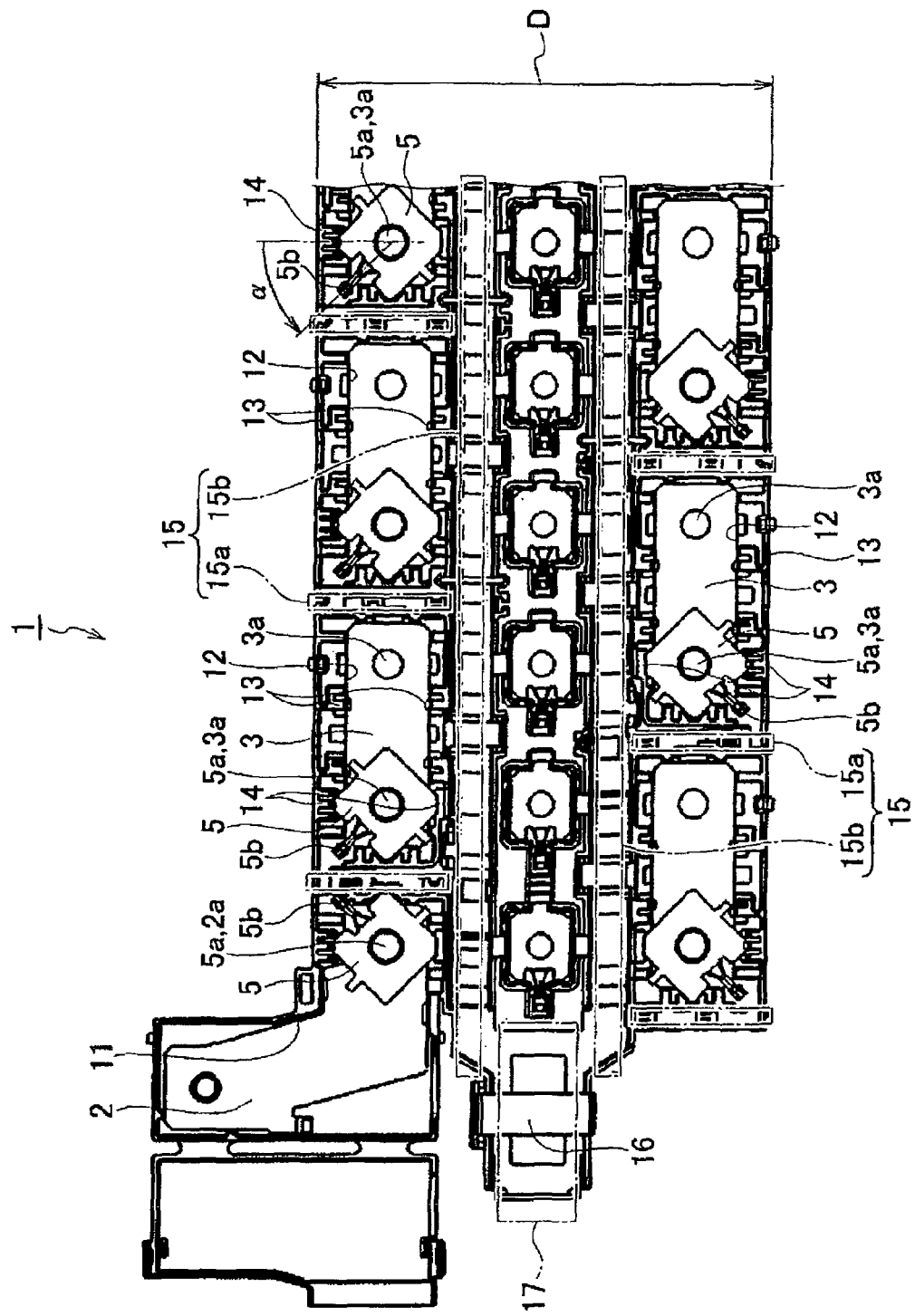
FIG. 2 is a partial plan view of the battery connector in which the case is not covered by the cover, for showing the first embodiment of the invention.

A battery assembly includes a plurality of batteries which include plus electrodes (in a bolt-like shape) and minus electrodes (in a bolt-like shape) on opposing surfaces. Twenty-four batteries are vertically disposed and layered in a horizontal direction, and these are layered in two stages in a vertical direction. The batteries adjacent to each other in the horizontal direction and the vertical direction are disposed so that the plus electrodes and the minus electrodes are alternately aligned on the same side. A pair of battery connectors is used to serially connect the plurality of batteries which are layered. One of the pair of battery connectors is shown in FIG. 1 and FIG. 2. Hereinafter, an explanation is made.

In FIG. 1 and FIG. 2, a battery connector 1 includes a plurality of terminals 2, 3 to be connected to each electrode (not shown in figures) of the batteries, a plurality of voltage detection terminals 5 which are partly superimposed on the respective terminals 2, 3, a case 10 which covers the plurality of terminals 2, 3 and the voltage detection terminals 5, and a plurality of covers 20 which cover an open face of the case 10.

The plurality of terminals 2, 3 are formed by a bus bar. The plurality of terminals 2, 3 include two end terminals 2 and twenty-three electrode-connection terminals 3. Each of the two end terminals 2 has one bolt-hole 2a, and is connected and fastened by a nut to the farthest end electrode (not shown in figures) of the serially-connected batteries. A power terminal (not shown in figures) is connected to each of the end terminals 2. Each of the electrode-connection terminals 3 has two bolt-holes 3a, and is connected and fastened by a nut to each electrode of adjacent batteries.

The voltage detection terminal 5 will be explained later.

The case 10 is formed by injection molding from insulating synthetic resin material. The case 10 includes twenty-five terminal fixing parts 11, 12, a pair of wire routing parts 15, and a connector fixing part 16. The end terminal 2 and the voltage connection terminal 5 are fixed in each of the two terminal fixing parts 11. The electrode-connection terminal and the voltage detection terminal 5 are fixed in each of the twenty-three terminal fixing parts 12. The twenty-five terminal fixing parts 11, 12 are aligned in upper and lower two lines. In the terminal fixing parts 11, 12 of each line, adjacent ones are disposed to be spaced from each other. Each of the terminal fixing parts 11, 12 is formed in a shape of engaging groove. Anti-terminal-disengagement lances 13, 14 are provided in each of the terminal fixing parts 11, 12 to prevent the engaged terminals 2, 3 and the engaged voltage detection terminals 5 from being disengaged.

Each of the wire routing parts 15 includes individual wire paths 15a which are provided between the adjacent terminal fixing parts 11, 12, and a bundle wires path 15b which is provided in the vicinity of the line of the terminal fixing parts 11, 12. The end of each bundle wires path 15b reaches the connector fixing part 16.

A connector 17 is fixed to the connector fixing part 16.

Next, the configuration of the voltage detection terminal 5 will be explained. Each voltage detection terminal 5 is formed in a flat square shape. Each voltage detection terminal 5 has one bolt-hole 5a. Each voltage detection terminal 5 is disposed on the end terminal 2 or the electrode-connection terminal 3. A wire connection part 5b is protruded from each voltage detection terminal 5. One end of an electric wire is connected to the wire connection part a by crimping.

Each voltage detection terminal 5 is fastened by a nut to an electrode of the battery together with each of the terminals 2, 3 so that the wire connection part a is inclined with respect to the individual wire path 15a of the wire routing part 15, and is located more interiorly than the edge of the case 10. An inclined angle α (shown in FIG. 2) of the wire connection part 5b is 45 degrees to an orthogonal direction to the edge of the case 10. The electric wire connected to each wire connection part 5b is folded immediately and guided to the near individual wire path 15a. The electric wires in the respective individual wire paths 15a are aggregated in the bundle wires path 15b, and guided to the connector 17. In this way, the other end of each electric wire is connected to the connector 17.

Figure 3:
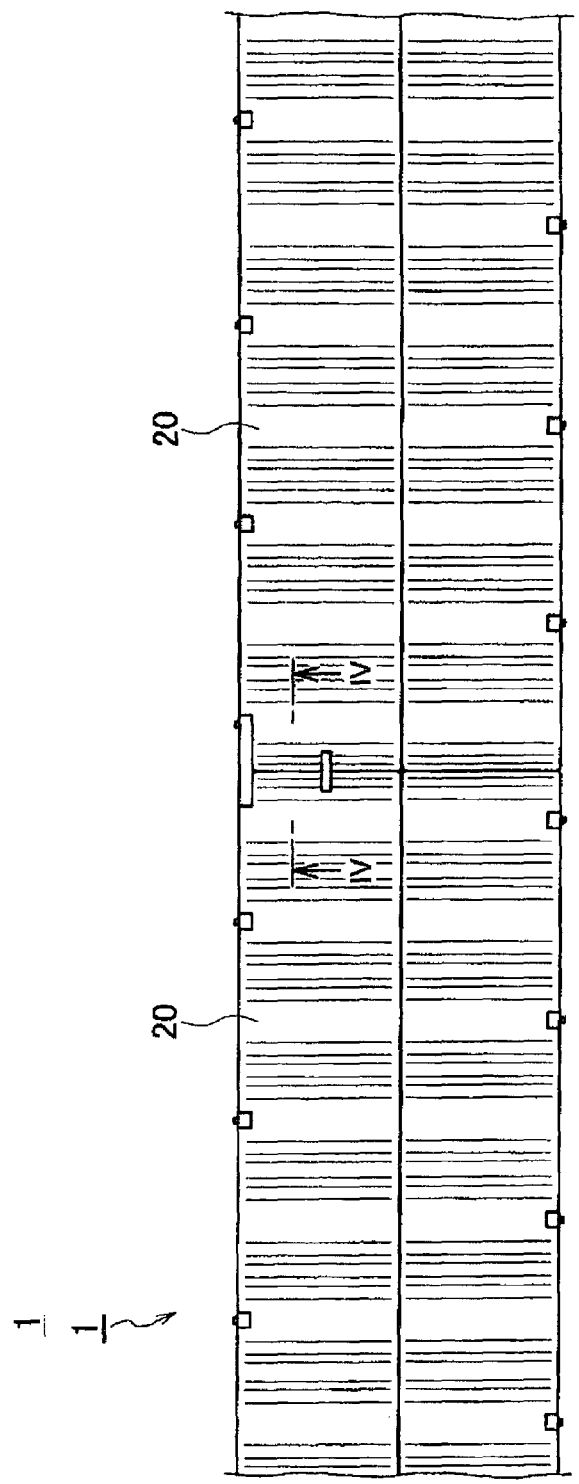
FIG. 3 is a plan view of the battery connector in which the case is covered by the cover, for showing the first embodiment of the invention.
Figure 4:
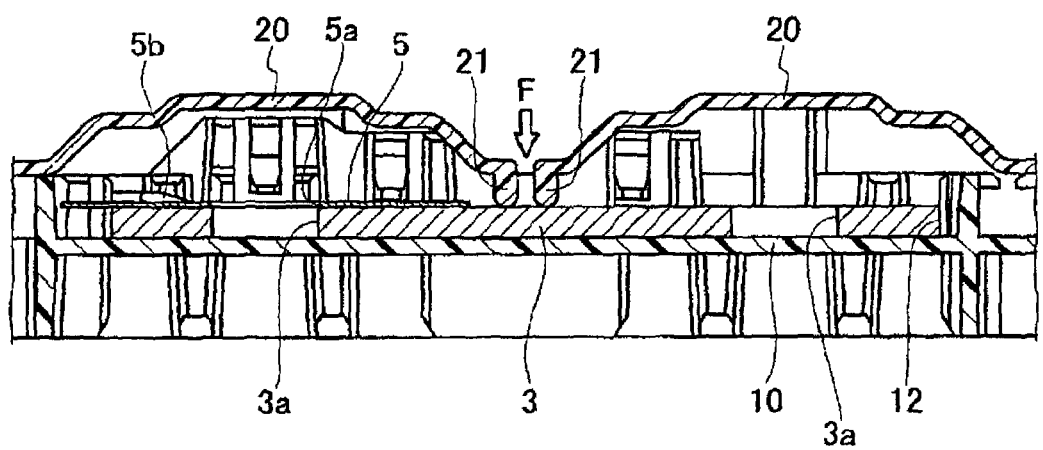
FIG. 4 is an enlarged cross-sectional view taken from line IV-IV in FIG. 3.
Figure 5:
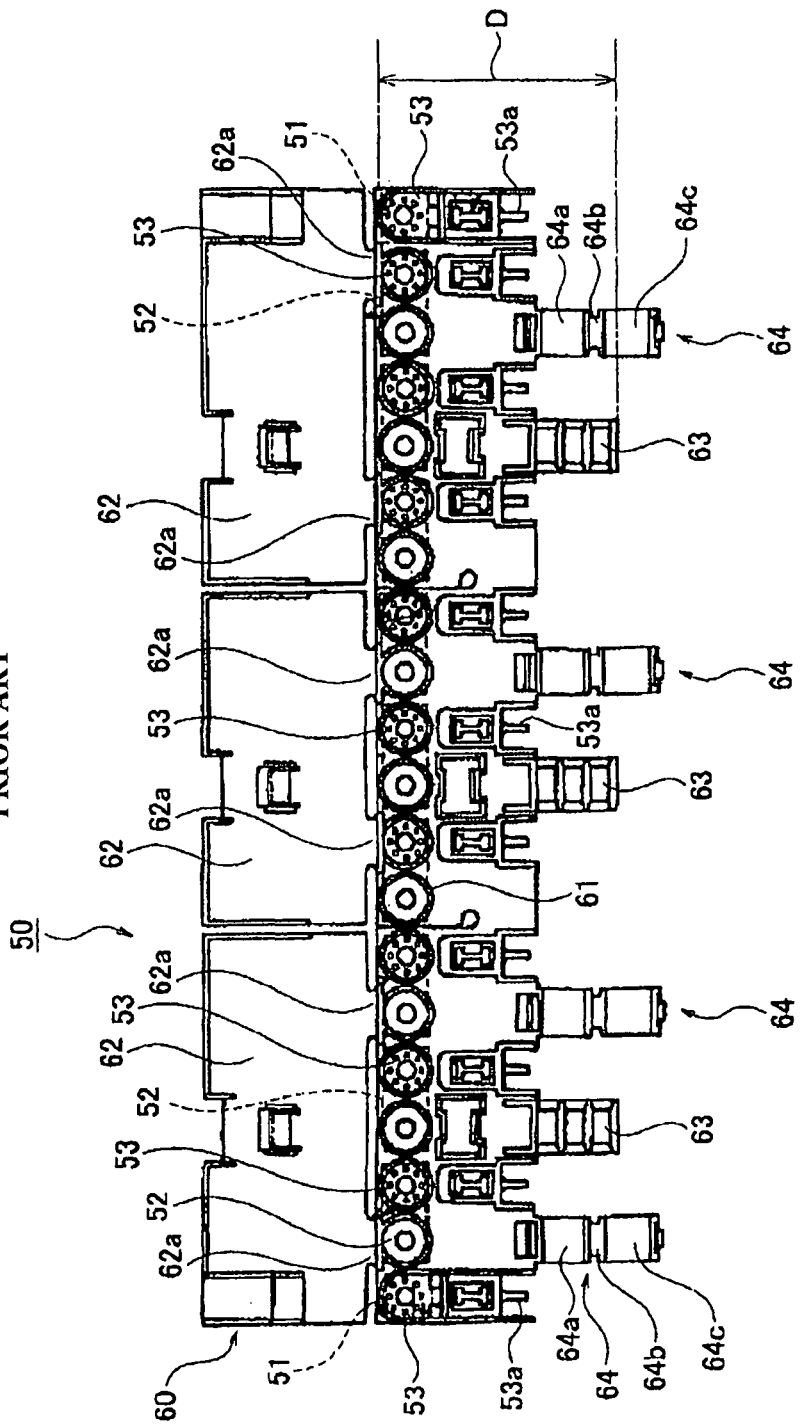
FIG. 5 is a front view of a battery connector, for showing a related art example.
Figure 6:
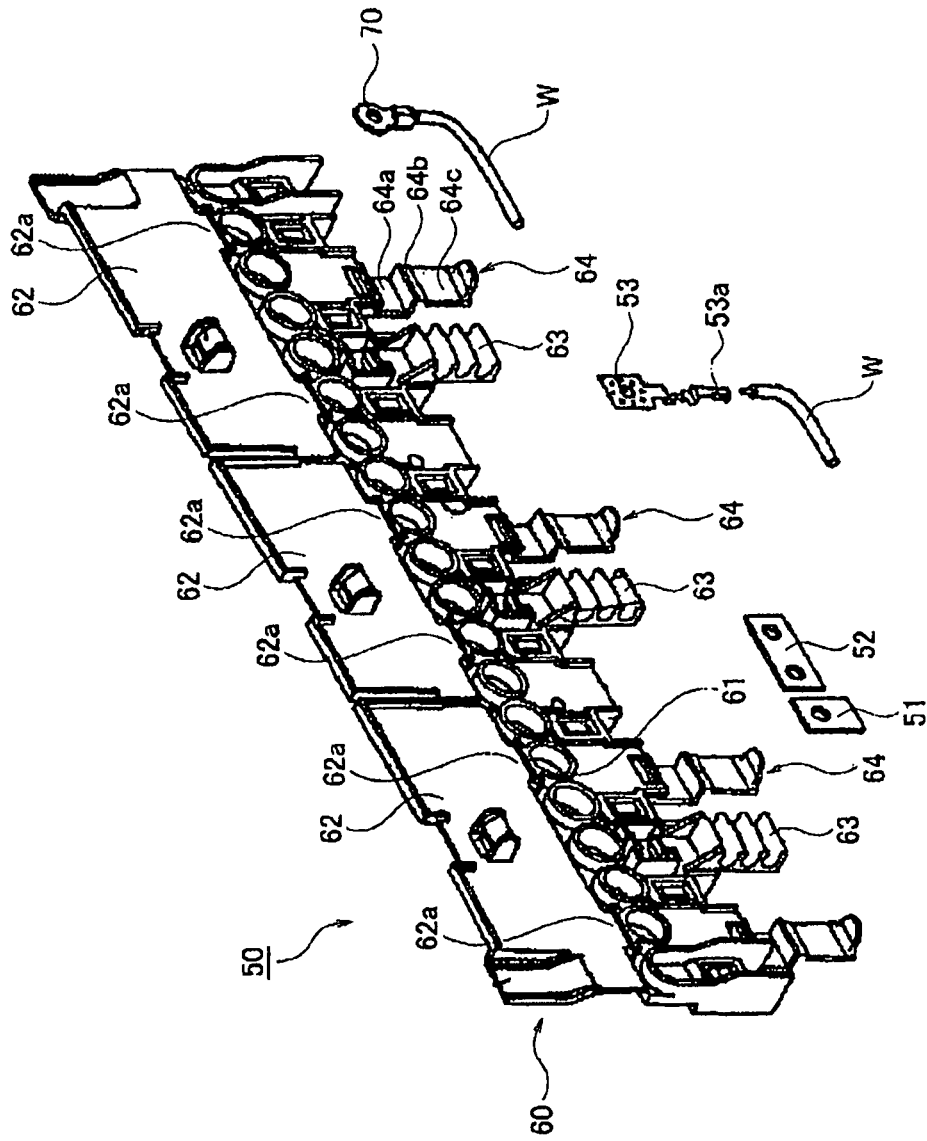
FIG. 6 is a perspective view of the battery connector, for showing the related art example.

Each of the covers 20 is formed by injection molding from insulating synthetic resin material. As shown in FIG. 3 and FIG. 4, each cover 20 covers a face of the case 10 in which the terminals 2, 3 and the voltage detection terminals 5 are disposed. Adjacent covers 20 are closely disposed without gap. A rib 21 which protrudes toward the case 10 from a side end of an inner surface of each cover 20 is provided. A head end of each rib 21 nearly contacts the electrode-connection terminal 3.

A plurality of covers 20 are used because of a constraint of size of a mold and for the purpose of sharing the components (the same-dimension cover is used even if the number of batteries is different).

As explained above, in the case 10, the adjacent terminals 2, 3 are fixed to be spaced from each other, the individual wire path 15a of the wire routing part 15 is provided between the adjacent terminals 2, 3, and each of the voltage detection terminals 5 is fixed so as to incline the wire connection part 5b with respect to the wire routing part 15 and to locate the wire connection part a more interiorly than the edge of the case 10. Accordingly, the wire connection part a of the voltage detection terminal 5 is not protruded more exteriorly than the edge of the case 10. Further, the wire routing part 15 is provided by utilizing a space between the terminal fixing parts 11, 12. Accordingly, it becomes possible to reduce a width dimension D (shown in FIG. 2) of the battery connector 1 at the location of the wire guide, and it causes the battery connector 1 to be smaller. Moreover, the electric wire to be connected to the wire connection part 5b of the voltage detection terminal 5 can be guided to the wire routing part 15 by folding it more loosely in comparison with a case where the voltage detection terminal 5 is fixed so as to direct the wire connection part 5b along the orthogonal direction to the edge of the case 10. Thus, the electric wire can be guided without folding it tightly (almost at 180 degrees) as much as possible. In this way, in the battery connector 1 having a function of guiding a drawn electric wire, the battery connector 1 can be made smaller, and the electric wire can be guided without folding it tightly as much as possible.

Further, the electric wire to be connected to the wire connection part a of the voltage detection terminal 5 is routed and guided with the case 10 of the battery connector 1. Thus, it is superior at reliability, tolerance, safety and the like, in comparison with the related art.

The inclined angle α of the wire connection part 5b is 45 degrees to an orthogonal direction to the edge of the case 10. Thus, it is surely achieved to minimize (compactize) the width dimension D of the battery connector 1, and to loosen the folding angle of the electric wire.

The battery connector 1 includes the plurality of voltage detection terminals 5, the number of which is correspondence with the number of batteries. Thus, a user can check the output voltage for each battery unit of the battery assembly, and easily find defective batteries.

The face of the case 10 in which the terminals 2, 3 and the voltage detection terminals 5 are disposed is covered by the plurality of covers 20, of which the adjacent ones are closely disposed. Each cover 20 is provided with the rib 21 which protrudes toward the case 10 from the side end of the inner surface of each cover 20. Thus, since the rib 21 is brought into contact with the case 10 even if a pressing force F is applied to the side end of the cover 20, the side end of the cover 20 is prevented from being deformed, and a gap is not caused to be produced at the linking part of the covers 20. In this way, a worker, etc. can be prevented from contact with the terminals 2, 3 and the like from the linking part of the covers 20.

In the embodiment, the terminals 2, 3 are fixed in the case 10 by engagement. Alternatively, as is the case in the related art, the terminals 2, 3 may be formed as insert parts, and they may be fixed in the case 10 by insert-molding the case 10.

The form of the battery connector 1 can be arbitrarily modified depending on the way of the batteries layer, or the way of the electrodes arrangement.

The present invention is useful to provide a compact-size battery connector having high reliability, tolerance, and safety, for example, in a small space in a vehicle.

What is claimed is:

1. A battery connector, comprising:
a plurality of terminals configured to connect a plurality of batteries;
a plurality of voltage detection terminals, each of which is connected to one of the plurality of terminals, each of the voltage detection terminals comprising a wire connection part configured to be connected to an electric wire; and
a case which contains the plurality of terminals and the plurality of voltage detection. terminals therein, wherein
the plurality of terminals are fixed in the case to be spaced from each other such that an individual wire path of a wire routing part is provided between adjacent terminals, and of the plurality of terminals, and
each of the plurality of voltage detection terminals is fixed such that the wire connection part is slanted with respect to the individual wire path.

2. The battery connector according to claim 1, wherein an angle between the wire connection part and the individual wire path is 45 degrees.

3. The battery connector according to claim 1, comprising:
a plurality of covers, of which adjacent covers are closely disposed, wherein
a face of the case in which the each of the plurality of terminals and the voltage detection terminals are disposed is covered by the plurality of covers, and
each of the covers is provided with a rib which protrudes toward the case from a side end of an inner surface of each of the covers.

4. The battery connector according to claim 1, comprising:
a connector fixing part to which a connector is to be fixed, wherein
the wire routing part includes a bundle wires path, an end of which is connected to the connector fixing part, and the bundle wires path is connected to the respective individual wire paths to guide electric wires extended from respective wire connection parts to the connector fixing part.

5. A battery connector, comprising:
a plurality of terminals configured to connect a plurality of batteries;
a plurality of voltage detection terminals, each of which is connected to one of the plurality of terminals, each of the plurality of voltage detection terminals comprising a wire connection part configured to be connected to an electric wire; and
a case which contains the plurality of terminals and the plurality of voltage detection terminals therein, wherein
the case is provided with a plurality of terminal fixing parts on which the plurality of terminals are fixed, such that the plurality of terminals are aligned in an alignment direction and spaced from each other, and
each of the plurality of voltage detection terminals is fixed on a corresponding one of the plurality of terminal fixing parts such that the wire connection part is slanted with respect to the alignment direction.

6. The battery connector according to claim 5, wherein
each of the plurality of terminal fixing parts has a rectangular shape with a long side in the alignment direction and a short side in a direction orthogonal to the alignment direction, and
the wire connection of each of the plurality of voltage detection terminals is disposed at a corner part of the terminal fixing part at which the long side of the terminal fixing part intersects with the short side.

7. The battery connector according to claim 5, wherein the case includes a wire routing part comprising a plurality of individual wire paths disposed between the plurality of terminal fixing parts and a bundle wires path disposed along the alignment direction and connecting the plurality of individual wire paths, and each of the plurality of voltage detection terminals is fixed so that the wire connection part is directed toward a side of one of the plurality of individual wire paths.

8. The battery connector according to claim 7, wherein the plurality of wire paths are perpendicular to the bundle wires path.

* * * * *